United States Patent [19]
Takano et al.

[11] Patent Number: 5,718,850
[45] Date of Patent: Feb. 17, 1998

[54] METHOD AND DEVICE FOR MANUFACTURING OPTICAL ELEMENTS

[75] Inventors: Toshiaki Takano; Jun Murata; Shoji Nakamura, all of Osaka; Masaaki Sunohara; Takahisa Kondou, both of Hyogo, all of Japan

[73] Assignee: Matsushita Electric Industrial Co., Ltd., Osaka, Japan

[21] Appl. No.: 547,298

[22] Filed: Oct. 24, 1995

[30] Foreign Application Priority Data

Nov. 1, 1994 [JP] Japan .................... 6-268705

[51] Int. Cl.$^6$ .................................... B29D 11/00
[52] U.S. Cl. ............... 264/2.4; 264/2.7; 264/40.5; 425/149; 425/407; 425/408; 425/808
[58] Field of Search ............... 264/2.4, 2.7, 40.5, 264/40.6; 425/407, 408, 808, 149, 143, 144

[56] References Cited

U.S. PATENT DOCUMENTS

| | | | |
|---|---|---|---|
| 2,298,429 | 10/1942 | Smith | 264/2.4 |
| 2,304,217 | 12/1942 | Tillyer . | |
| 2,304,663 | 12/1942 | Smith et al. | 264/2.4 |
| 2,332,674 | 10/1943 | Smith | 264/2.4 |
| 2,432,668 | 12/1947 | Kingston . | |
| 5,100,590 | 3/1992 | Ruhlin | 425/808 |
| 5,204,127 | 4/1993 | Prusha . | |
| 5,368,790 | 11/1994 | Greshes | 264/2.4 |

FOREIGN PATENT DOCUMENTS

| | | | |
|---|---|---|---|
| 2 480 667 | 10/1981 | France . | |
| 2 591 525 | 6/1987 | France . | |
| 59-212221 | 1/1984 | Japan . | |
| 59-214622 | 4/1984 | Japan . | |
| 62-227730 | 10/1987 | Japan | 425/808 |
| 1-316252 | 12/1989 | Japan | 425/808 |
| 5-177725 | 7/1993 | Japan . | |
| WO 89/02818 | 4/1989 | WIPO . | |

*Primary Examiner*—Mathieu D. Vargot
*Attorney, Agent, or Firm*—Merchant, Gould, Smith, Edell, Welter & Schmidt, P.A.

[57] ABSTRACT

Optical material, which was already roughly molded, is deposited into a space defined by a top mold, a bottom mold and a drum mold, and is then heated, pressed and molded, thus providing an optical element. By controlling the rate of plastic deformation of the optical material so as to prevent the material from entering clearance sections between the outside diameter of the top mold or of the bottom mold and the inside diameter of the drum mold, an optical element of high precision with no burr nor strain is provided at low cost.

12 Claims, 12 Drawing Sheets

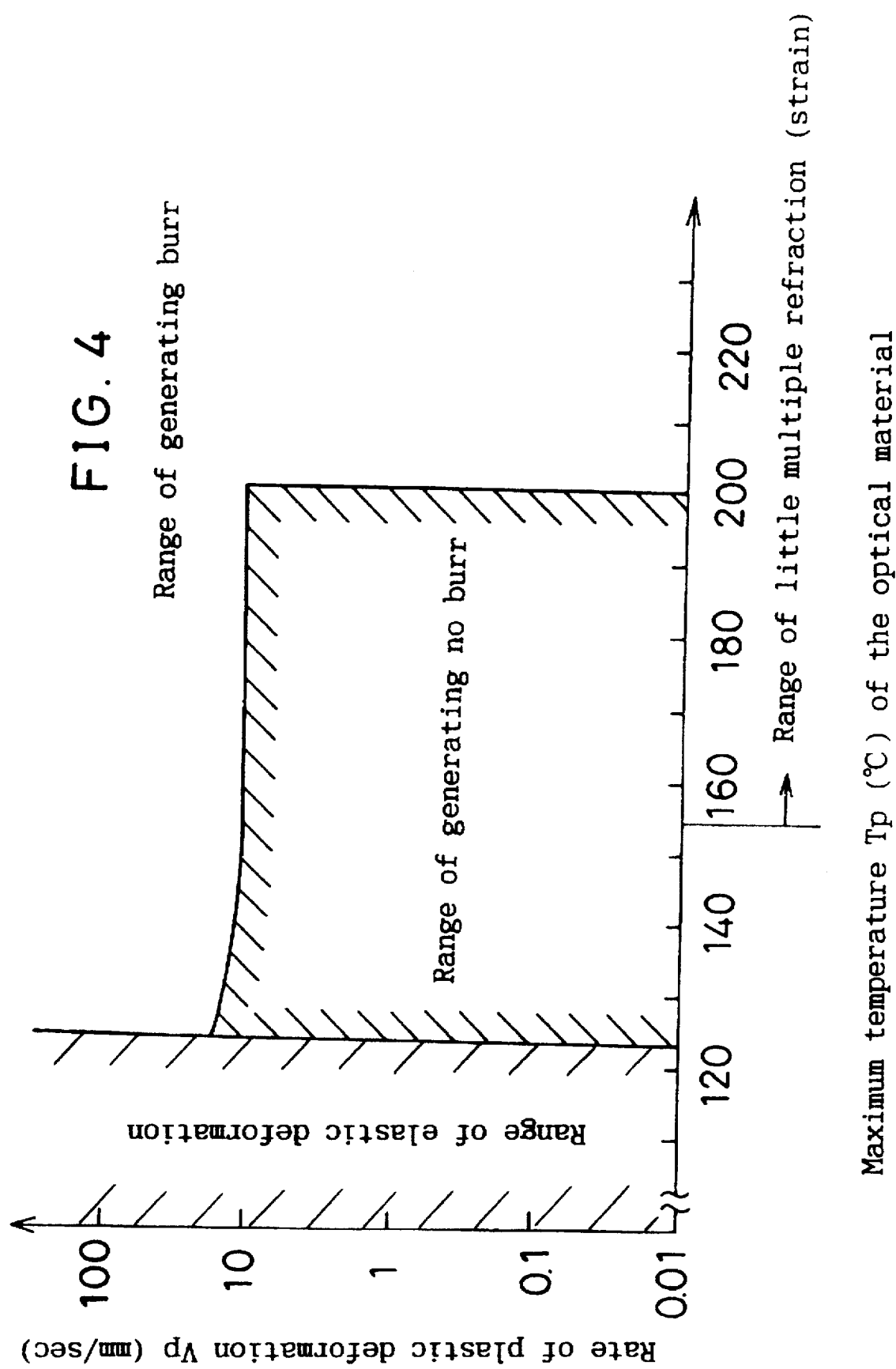

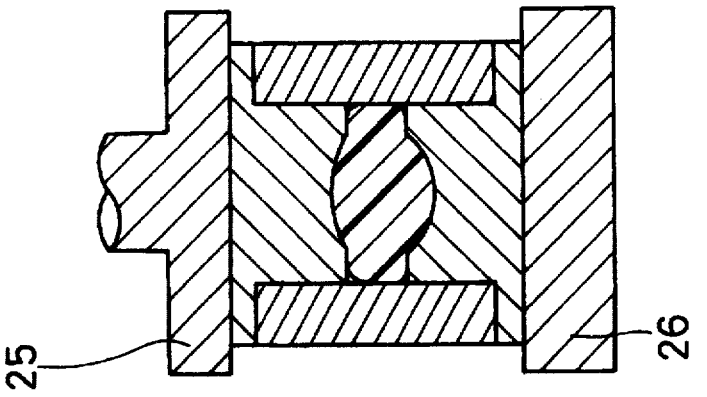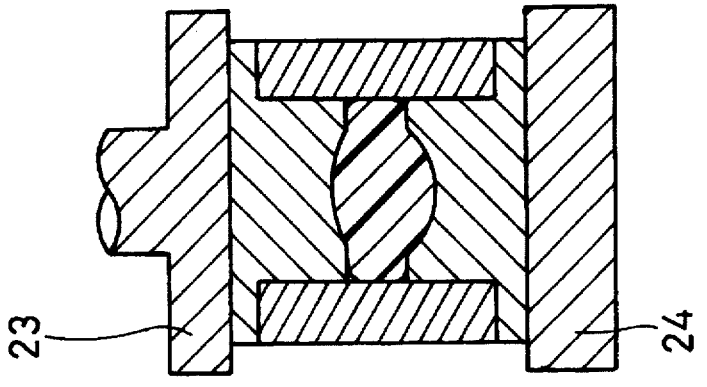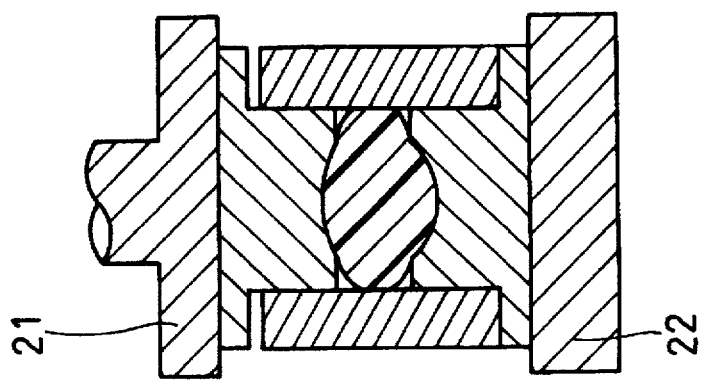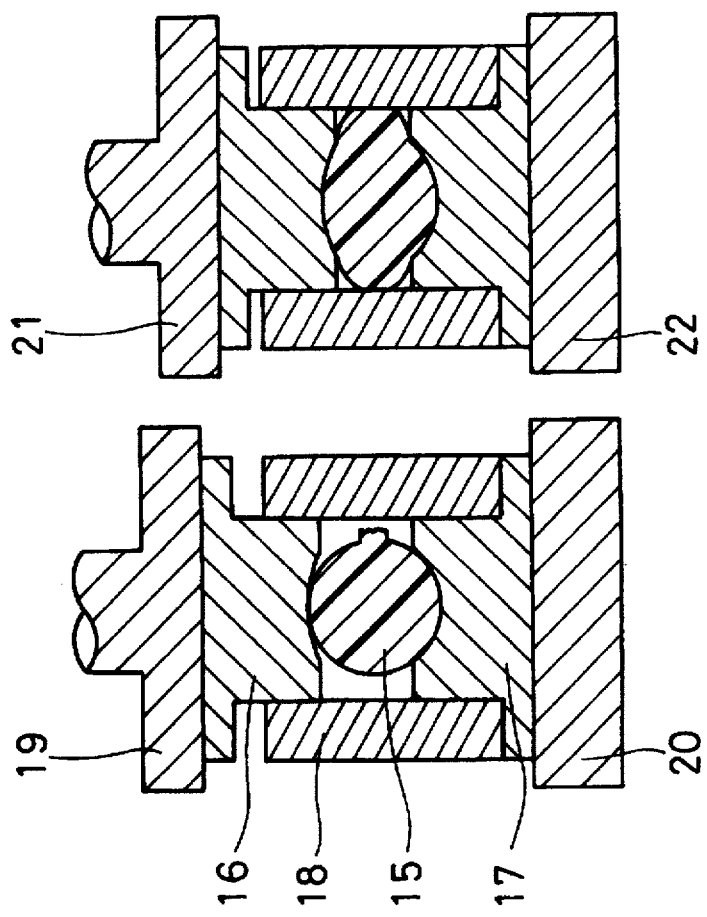

5,718,850

1

METHOD AND DEVICE FOR MANUFACTURING OPTICAL ELEMENTS

FIELD OF THE INVENTION

This invention relates to an optical elements, a method and a device for manufacturing high precision optical elements such as a lens, prism and mirror used in optical instruments.

BACKGROUND OF THE INVENTION

Conventional press-molding methods for optical elements include, for example, an injection molding method and a compression molding method (Published Unexamined (Kokai) Japanese Patent Application No. Hei 5-177725). In the injection molding method, a pellet is injected and filled in a cavity, formed by an insert, after heating, kneading and melting the pellet. In the compression molding method, a plastic material which is molded in a final shape by the injection molding method is placed in a mold kept at a certain temperature, and is then compressed.

FIG. 11 shows a conventional molding method. In the figure, 27 is an optical element; 28 is a top mold; 29 is a bottom mold; 30 is a drum mold; 31 is a section of a press head including a heat pressing mechanism; and 32 is a section of a press stage having a heating mechanism. FIG. 12A and FIG. 12B show changes in temperature and pressure in the conventional molding method. FIG. 12A shows the temperature of the optical element. FIG. 12B indicates the pressure by the press head.

An optical element (polycarbonate) which was molded into a final shape by the injection molding method is placed in a cavity consisting of top mold 28, bottom mold 29, and drum 30. The temperature of the top mold, the bottom mold and the drum mold is set higher than a deflection temperature (measured by D648 (ATM)) and lower than the glass transition point. When the temperature of the optical element becomes nearly the same as the temperature of the molds, press head 31 is lowered. After deforming the optical element by a pressure of about 100 kgf/cm$^2$ with top mold 28, no pressure is added. Molded optical element 27 is then removed from the top mold after being cooled down to the deflection temperature.

In this conventional method, the element is molded under extremely high pressure, so that the optical material enters clearance sections between the top mold or the bottom mold and the drum mold. As a result, molded optical element 45 is formed with burr (46 in FIG. 13). Optical elements formed with such a burr result in uneven properties and mounting problems for instruments. Therefore, the optical elements with a burr have to be worked to remove the burr. Moreover, burr remaining on the top, bottom and drum mold also has to be removed. As a result, the cost of manufacturing optical elements becomes high.

The optical elements molded by the conventional injection molding method have gate cut sections. As the temperature of optical elements during molding increases, concave sections are formed at the gate cut sections. The concave section remains on the optically functional area of an optical element. In other words, the optical elements formed in this method have poor shape and optical properties, and inferior yields.

The gate cut sections are sections where resin is cut at a gate section. The gate section is an opening where resin is injected into the cavity of a mold during injection molding processes. Since resin is cut after being injected into the gate section, internal stress is likely to remain and concentrate in a section of the resin, thus forming a defect such as a strain.

SUMMARY OF THE INVENTION

It is an object of this invention to solve the above-noted conventional problems by providing a method of manufacturing the optical element that does not permit optical material to enter clearance sections between a top mold or a bottom mold and a drum mold, and a device for manufacturing optical elements having superior optical properties with high precision.

In order to accomplish these and other objects and advantages, the method of manufacturing optical elements of this invention includes the steps of depositing an optical material, which was already roughly molded, into a space defined by a top mold, a bottom mold and a drum mold and of heating and pressing the optical material. The rate of plastic deformation of the optical material is controlled so as to prevent the material from flowing into clearance sections between the outside diameter of the top mold and the inside diameter of the drum mold, and between the outside diameter of the bottom mold and the inside diameter of the drum mold.

It is preferable that the rate of plastic deformation of the optical material is controlled to less than 10 mm/second at least during the final deformation process.

It is also preferable that temperature be maintained at $(Tg+15) \leq Tp \leq (Tg+60)$ during the molding process of an optical material, where Tp is the maximum temperature of the optical material and Tg is the glass transition point of resin of the optical material.

It is preferable that the optical material is pressed and deformed with 1.5–25.0 kgf/cm$^2$ pressure in a range from the glass transition point (Tg) to the maximum temperature (Tp).

It is also preferable that the optical material is preliminarily deformed until the material reaches the maximum temperature (Tp), and that the material is pressed with 1.5–25.0 kgf/cm$^2$ pressure while being cooled from Tp to the glass transition point (Tg).

It is further preferable that the optical material is roughly molded by an injection molding method before the deformation process.

It is preferable that the optical material has a gate cut section formed during the injection molding processes, and that the gate cut section is convex.

It is also preferable that the optical mterial, which was already roughly molded, has a gate cut section, and that the material is deposited so that the gate cut section faces the internal surface of a drum mold or the moving side of a pressing means.

The optical elements of this invention are prepared by a method of manufacturing optical elements comprising the steps of: depositing an optical material, which was already roughly molded, into a space defined by a top mold, a bottom mold and a drum mold; and heating and pressing the optical material; wherein a rate of plastic deformation of the optical material is controlled so as to prevent the optical material from flowing into clearance sections between an outside diameter of the top mold or of the bottom mold and an inside diameter of the drum mold. The optical elements is formed essentially no burr nor strain in optical effective area.

It is preferable that the element is a lens for use in optical instruments.

It is preferable that the element is a prism for use in optical instruments.

It is preferable that the element is a mirror for use in optical instruments.

The device for manufacturing optical elements of this invention includes a top mold, a bottom mold, a drum mold, and a means to control the rate of plastic deformation of optical material. The device heats, presses and molds optical material after the material is deposited into a space between the top, bottom and drum molds. The means to control the rate of plastic deformation of the optical material prevents the material from flowing into clearance sections between the outside diameter of the top mold and the inside diameter of the drum mold, and between the outside diameter of the bottom mold and the inside diameter of the drum mold.

It is preferable that the rate of plastic deformation of the optical mold is controlled to less than 10 mm/second by the means.

It is also preferable that the device further includes a means to maintain temperature at $(Tg+15) \leq Tp \leq (Tg+60)$ during the molding process of an optical material, where Tp is the maximum temperature of the optical material and Tg is the glass transition point of resin of the optical material.

It is preferable that the device further includes a means to deform optical material with 1.5–25.0 kgf/cm² of pressure within a range between the glass transition point (Tg) and the maximum temperature (Tp).

It is preferable that the device further includes a means to preliminarily deform optical material until the material reaches the maximum temperature (Tp) and a means to deform the material with 1.5–25.0 kgf/cm² pressure while the material is cooled from Tp to the glass transition point (Tg).

It is also preferable that the device further includes a means to deposit optical material into a space between the top, bottom and drum molds so that the gate cut section of the optical material faces the internal surface of the drum mold and the moving side of a pressing means.

Optical material enters a clearance section among a top mold, a bottom mold, and a drum mold when the rate of plastic deformation of the material is faster than a certain rate. Thus, the rate of plastic deformation is reduced during the molding process in this invention, thus preventing the optical material from entering the clearance section. The rate of plastic deformation is controlled by setting the lowering speed of a press head, optical material temperature, and press pressure.

$(Tg+15) \leq Tp \leq (Tg+60)$ during the molding process of an optical material, where Tp is the maximum temperature and Tg is the glass transition point of the optical material, and pressure is added up to temperature lower than the deflection temperature, so that the transfer surface of the top or bottom mold is transferred onto optical material at high precision and an optical element with preferable optical properties is provided. The deflection temperature is measured by D648 (ASTM).

Even if a concave section is formed in an optical material which was preliminary molded by an injection molding method, in the process of increasing temperature for pressing and molding the optical material, a means for supplying the optical material to face the internal surface of a drum mold or the mobile surface of a pressing means is applied. As a result, the concave section provides no negative effect on an optical element.

A means is applied in this invention which leaves a gate cut section of an optical material, preliminary molded by an injection method, in a convex form, thus preventing the gate cut section from becoming concave even when the temperature of the optical material increases during a pressing and molding process.

Thus, an optical element having no burr is manufactured in this invention, so that a process for removing the burr is not required. As a result, the productivity of optical elements improves, and the cost of the elements is reduced. A strain is unlikely to remain inside an optical element, so that an optical element such as a thin lens having a small diameter is molded.

Moreover, by restricting the direction of the supply of an optical material which was preliminary molded by an injection molding method, a concave section formed in the gate cut section of the material is removed, and the yield of optical elements is improved.

By leaving the gate section of the optical material in a convex form, a preferable optical element is provided without being dependent on the direction of supply of the material. Thus, the yield of optical elements improves, and the cost of manufacturing the elements is reduced.

BRIEF DESCRIPTION OF THE DRAWINGS

FIG. 4 is a graph showing the no burr-generating molding conditions range of the embodiment of the invention.

FIG. 9A is a cross-sectional view showing a heating process of the embodiment of the molding method of the invention.

FIG. 9B is a cross-sectional view showing a preliminary deformation step of the embodiment of the molding method of the invention.

FIG. 9C is a cross-sectional view showing a final deformation step of the embodiment of the molding method of the invention.

FIG. 9D is a cross-sectional view showing a cooling process of the embodiment of the molding method of the invention.

DETAILED DESCRIPTION OF THE INVENTION

This invention will be described by referring to the following illustrative examples and attached figures.

EXAMPLE 1

Figure 1A:
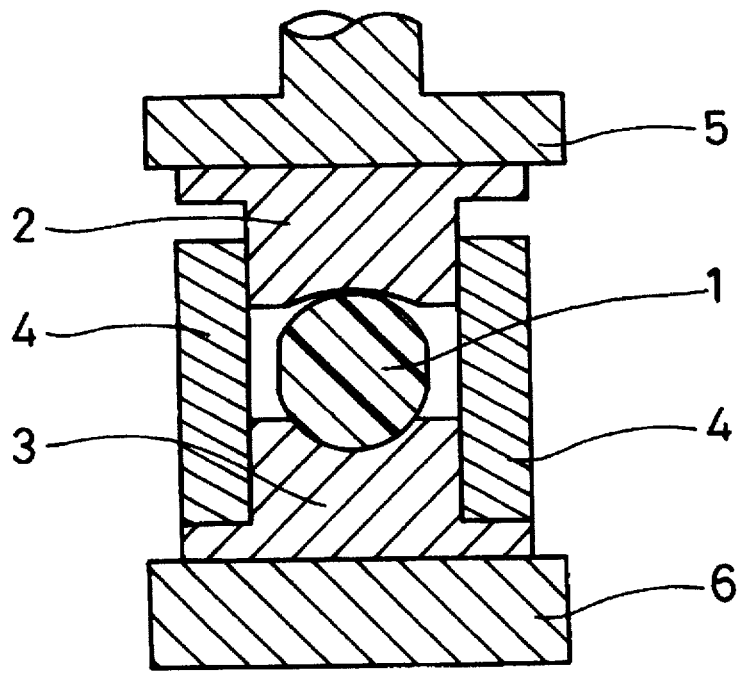
FIG. 1A is a cross-sectional view showing an optical material of one embodiment of the invention before being molded.
Figure 1B:
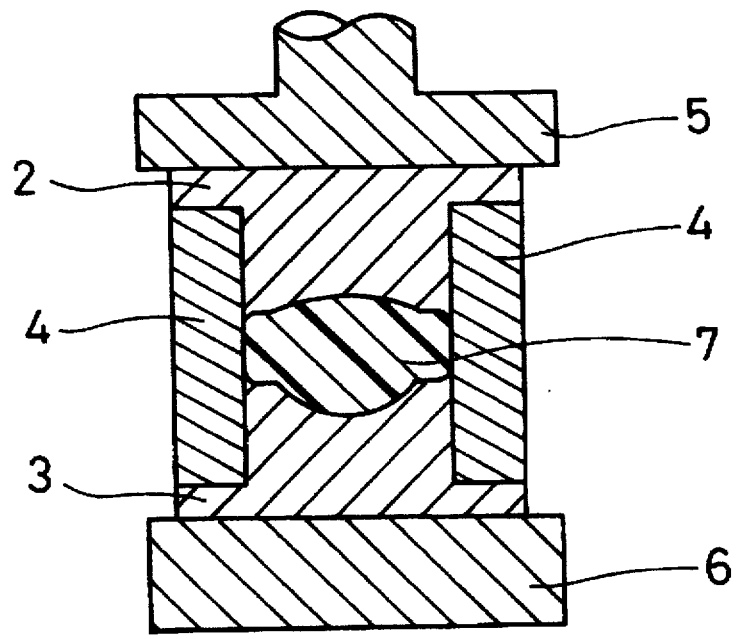
FIG. 1B is a cross-sectional view showing the optical material of the embodiment of the invention after being molded.

FIG. 1A is a cross-sectional view of an optical material before being molded. FIG. 1B is a cross-sectional view of the optical material after being molded. In the figures, 1 is an optical material; 2 is a top mold; 3 is a bottom mold; 4 is a drum mold; 5 is a section of a press head having a lowering speed controlling device; 6 is a section of a press stage with a heating device; and 7 is an optical element being molded.

Figure 2:
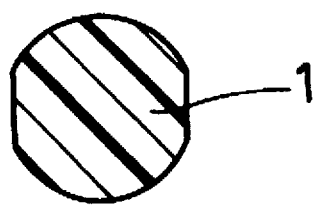
FIG. 2 is a cross-sectional view of an optical material of the embodiment of the invention.

As shown in FIG. 1A, optical material 1 is placed in the space defined by top mold 2, bottom mold 3, and drum mold 4, and between press head 5 and press stage 6. A polyolefin resin (a trade name "ZEONEX", Nippon Zeon Co., Ltd. 140° C. glass transition point Tg, and 123° C. deflection temperature Tt) block is cut and worked so as to provide optical material 1 with 2.5 mm Rs and 4.675 mm central thickness (t) as shown in FIG. 2.

Cemented carbide was used for top mold 2, bottom mold 3 and drum mold 4, and was worked into preferable shapes. The clearance between the outside diameter of top mold 2 or of bottom mold 3 and the inside diameter of drum mold 4 is about 5 µm.

Optical element 7 roughly has 2.9 mm R1, 4.6 mm R2, 3.2 mm central thickness (t), and 5.0 mm outside diameter.

Optical material 1 is heated to 170° C. Tp (predetermined temperature) by press head 5 and press stage 6 for ten minutes. When the temperature of optical material 1 reaches Tp, press head 5 is advanced at 0.1 mm/sec Vp, and optical material 1 is deformed by top mold 2. In other words, the speed Vp of press head 5 is the rate of plastic deformation (Vp) of the optical material. Press head 5 stops lowering as soon as drum mold 4 is in contact with top mold 2.

After being kept at predetermined temperature Tp for ten minutes, deformed optical material 1 is cooled down to deflection temperature (Tt) for ten minutes while press head 5 is advancing. Press head 5 and top mold 2 are opened, and optical element 7 is then taken out. When the pressure is removed before the temperature reaches the deflection temperature, the optical material recovers elastically. Thus, the transfer precision of the material deteriorates. With the temperature below the deflection temperature (Tt), press head 5 is released, and top mold 2 is opened so as to remove optical element 7. Under conditions of 170° C. Tp (maximum temperature) and 3.5 kgf/cm$^2$ pressure (P), an optical element was provided. The optical element had no burr shown in FIG. 3A, and had a desirable transmitted wave area and a preferable central thickness. The rate of plastic deformation of the optical material was 0.1 mm/sec.

Figure 3A:
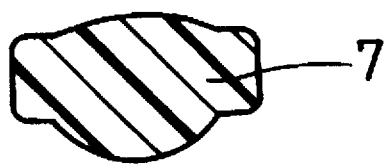
FIG. 3A is a cross-sectional view of an optical element of the embodiment of the invention.

Optical element 7 has no burr as shown in FIG. 3A since no optical material 1 enters the clearance between the outside diameter of top mold 2 or bottom mold 3 and the inside diameter of drum mold 4.

FIG. 4 is a graph showing the correlations between predetermined temperature Tp and the rate of plastic deformation Vp and indicating the range of generating no burr. The horizontal axis indicates maximum temperature Tp of the optical material during the molding process while the vertical axis indicates the rate of plastic deformation Vp of the optical material. As clearly shown in FIG. 4, no burr is generated when maximum temperature Tp and the rate of plastic deformation Vp are controlled.

Figure 3B:
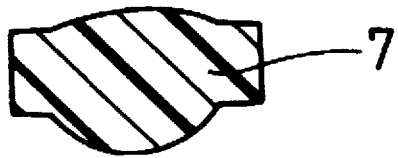
FIG. 3B is a cross-sectional view of an optical element of the embodiment of the invention.

An optical element shown in FIG. 3A is provided when the Tp maximum temperature is in a range between a Tt deflection temperature and a Tg+40° C. glass transition point, and the rate of plastic deformation was below 10 mm/sec. With a Tp maximum temperature in a range between Tg+40° C. glass transition point and Tg+60° C. glass transition point, an optical element shown in FIG. 3B is obtained. The optical element shown in FIG. 3B has no burr, but has sections which almost reached the clearance section. In consideration of easy mounting to optical instruments and of even molding temperature and pressure in the mass-manufacturing process, Tp maximum temperature is preferably in the range between Tt deflection temperature and Tg+40° C. glass transition point.

Figure 13:
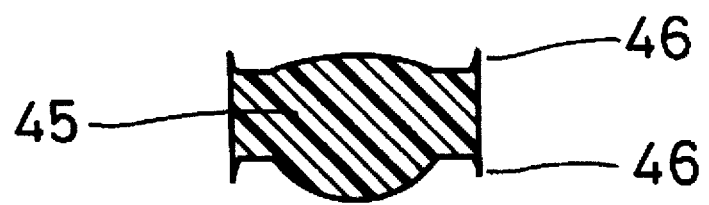
FIG. 13 is a cross-sectional view of an optical element with burr molded by the conventional molding method.

If the Tp maximum temperature is in another range, a burr is found on optical elements as shown in FIG. 13 (45 indicates the burr). With Tp predetermined temperature below Tt deflection temperature, the optical element does not deform since the temperature is in the range of elastic deformation. If pressure is added to an optical material forcibly, the optical element with a crack is provided.

With Tp higher than the glass transition point, an optical material melts and deforms while the rate of plastic deformation of the optical material is not dependent on the lowering speed of a press head. Furthermore, the optical material enters a clearance section between the outside diameter of a top mold or a bottom mold and the inside diameter of a drum mold, thus forming a burr.

When optical elements with no burr were evaluated with the surface wavefront of transmitted light, the ones which were prepared at the predetermined temperature of the glass transition point (Tg+15° C.) or higher were preferable (less than 0.03λ, and λ=633 nm) and had little multiple refraction.

Even though the rate of plastic deformation of an optical material is controlled by the advancing speed of a press head in this example, it may be controlled by temperature, pressure or the like.

Instead of using cut optical materials as in this example, optical materials which are mass produced by the injection molding method with small cost may be used. The same results are expected from another optical material such as thermoplastic resin (polycarbonate (PC), polymethyl methacrylate (PMMA), and the like).

The heating time up to temperature Tp, the time at temperature Tp, and the cooling time from temperature Tp to the deflection temeprature are not limited to the ones mentioned above. An optical element can be removed from the mold as long as the optical element temperature is less than the deflection temperature. The material of the top, bottom and drum mold is not limited to cemented alloy metal; other materials such as SUS and inorganic glass may be applied. A protective layer may also be formed on these molds.

EXAMPLE 2

Figure 5A:
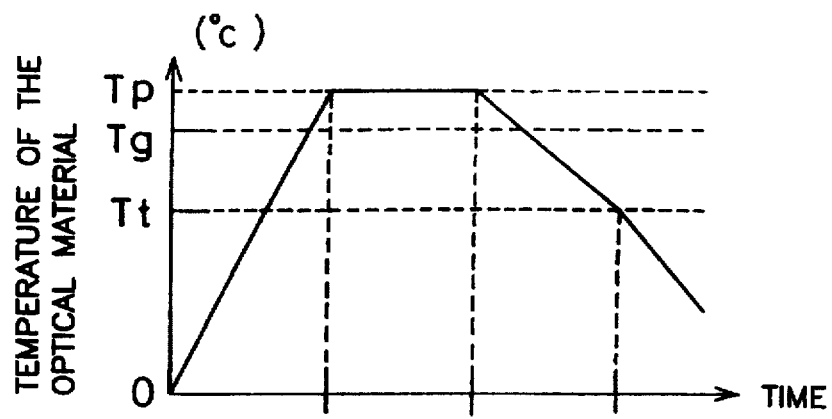
FIG. 5A is a graph showing the change in temperature of an optical element during a molding process of another embodiment of the invention.
Figure 5B:
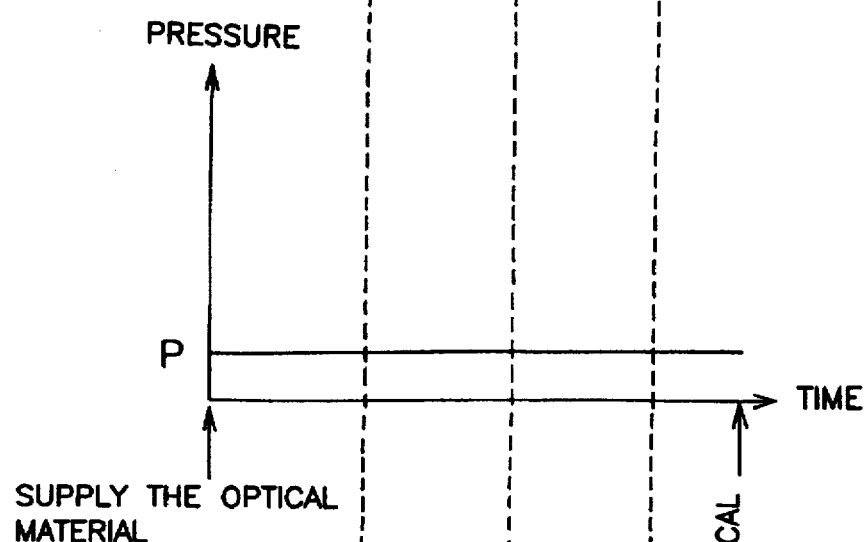
FIG. 5B is a graph showing the change in pressure during the molding process of the embodiment of the invention.
Figure 5C:
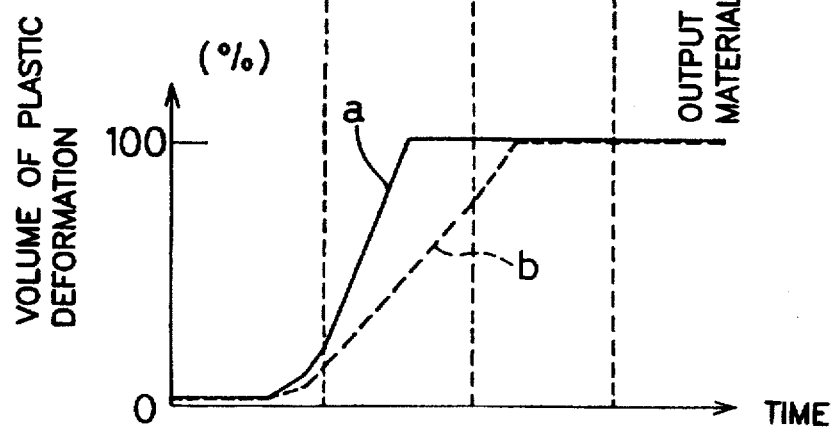
FIG. 5C is a graph showing the rate of plastic deformation during the molding process of the embodiment of the invention.

FIG. 5A shows the change in temperature of an optical material. FIG. 5B shows the change in pressure. FIG. 5C shows the change in plastic deformation. The horizontal axes in the figures indicate time.

Figure 6A:
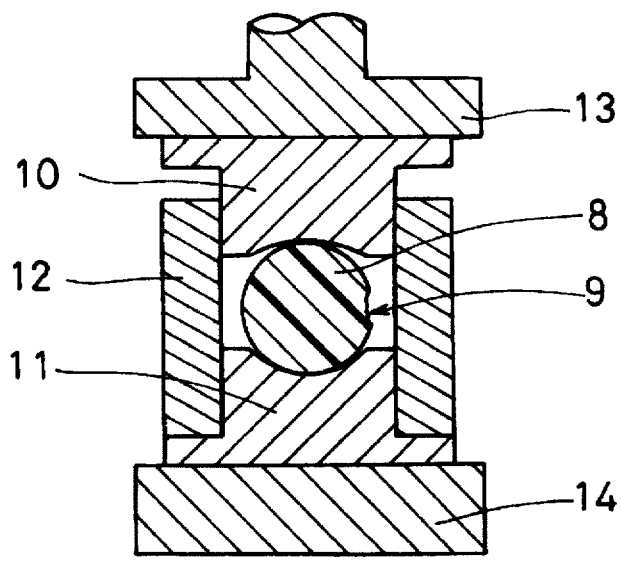
FIG. 6A is a cross-sectional view showing the gate cut section of the optical material of the embodiment of the invention facing the inside surface of a drum mold.
Figure 6B:
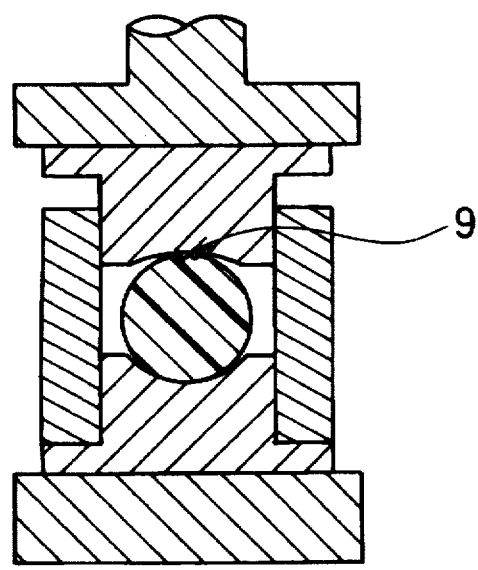
FIG. 6B is a cross-sectional view showing the gate cut section of the optical material of the embodiment of the invention facing a press head.
Figure 6C:
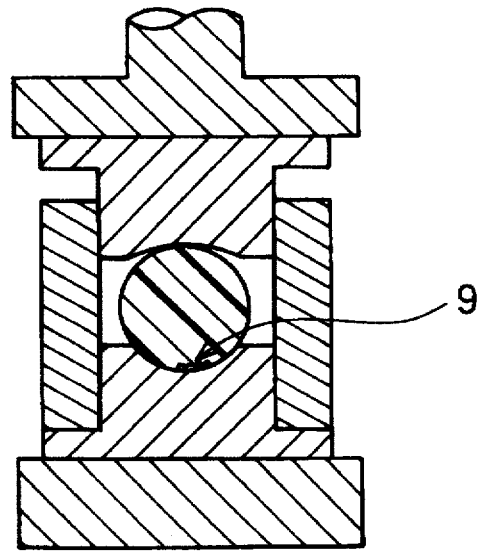
FIG. 6C is a cross-sectional view showing the gate cut section of the optical material of the embodiment of the invention facing a press stage.

FIG. 6A is a cross-sectional view which shows an optical element prepared by the injection molding method being oriented with its gate section facing the internal surface of the drum mold. FIG. 6B is a cross-sectional view, which shows the optical element oriented with its gate section facing the top mold. FIG. 6C is a cross-sectional view, which shows the optical element being oriented with its gate section facing the bottom mold.

In FIGS. 6A, 6B and 6C, 8 indicates the optical material prepared by the injection molding method; 9 is the gate section of the optical material; 10 is the top mold; 11 is the bottom mold; 12 is the drum mold; 13 is a section of a press head having a heating and pressing mechanism; and 14 is a section of a press stage with a heating mechanism.

As shown in FIG. 6A, optical element 8 prepared by the injection molding method was placed between top mold 10, bottom mold 11 and drum mold 12 while the gate section is set to face the internal surface of drum mold 12.

Figure 7A:
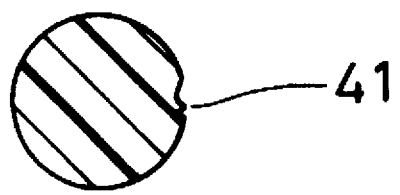
FIG. 7A is a cross-sectional view of an optical material with a gate cut section of another embodiment of the invention molded by the injection molding method.

Polyolefin resin was used as optical material 8. The glass transition point (Tg) was 140° C. while the deflection temperature (Tt) was 123° C. The optical material has a spherical shape of 4.48 mm diameter, and has a gate cut section 41 as shown in FIG. 7A.

Top mold 10, bottom mold 11, and drum mold 12 used in Example 1 were also used in this example. The optical material was placed between press head 13 and press stage 14. The pressure (P) was kept at 5.0 kgf/cm$^2$ as shown in FIG. 5B. As in FIG. 6A, the optical material was heated by press head 5 and press stage 6 until the temperature (Tp) of the material reached above the glass transition point (155° C.). The temperature was controlled so as to reach Tp in 15 minutes.

As shown in FIG. 6C, optical material 8 is slightly in elastic deformation at a temperature below the deflection temperature (Tt). However, at a temperature above the load deflection temperature, the optical material is gradually in plastic deformation. The rate of plastic deformation is a ratio, {(central thickness of an optical material before molding—central thickness of the optical material during the molding)/(central thickness of the optical material before the molding—central thickness of an optical element)}.

The deformation of the optical material proceeds when the temperature exceeds the glass transition point (Tg). In this example, maximum temperature (Tp) was kept for 20 minutes. There are various deformation processes, depending on maximum temperature (Tp) and pressure (p) (A and B in FIG. 5C).

The optical material is then cooled by press head 13 and press stage 14 so as to set the temperature below deflection temperature (Tt) in thirty minutes while pressure is applied to the material. When the pressure is removed before the temperature reaches the deflection temperature, the optical material recovers elastically. Thus, the transfer precision of the material deteriorates.

With the temperature below the deflection temperature (Tt), press head 13 is released, and top mold 10 is opened so as to remove optical element 8. Under conditions of 155° C. Tp (maximum temperature) and 5.0 kgf/cm$^2$ pressure (P), an optical element was provided. The optical element had no burr shown in FIG. 3A, and had a desirable transmitted wave area and a preferable central thickness. The rate of plastic deformation of the optical material was 0.07 mm/sec.

Experiments were directed to check the change in the rate of plastic deformation while maximum temperature (Tp) and pressure (P) were changed. The following table shows evaluations of the experiments. The transmitted wave area of an optical element was tested by an interferometer.

TABLE 1

| Maximum Temp Tp (°C.) | (1) | (2) | (3) | (4) | (5) |
|---|---|---|---|---|---|
| 205 | 1.0 | 11.1 | Found | 0.025 | A |
|  | 1.5 | 14.3 | Found | 0.020 | A |
|  | 5.0 | 20.0 | Found | 0.019 | A |
|  | 25.0 | 33.3 | Found | 0.023 | A |
|  | 25.5 | 50.0 | Found | 0.026 | A |
| 200 | 1.0 | — | Not Found | 0.038 | B |
|  | 1.5 | 1.50 | Not Found | 0.021 | A |
|  | 5.0 | 5.60 | Not Found | 0.024 | A |
|  | 25.0 | 9.68 | Not F6und | 0.023 | A |
|  | 25.5 | 39.5 | Found | 0.028 | A |
| 190 | 1.0 | — | Not Found | 0.042 | B |
|  | 1.5 | 0.10 | Not Found | 0.022 | A |
|  | 5.0 | 1.12 | Not Found | 0.029 | A |
|  | 25.0 | 4.59 | Not Found | 0.027 | A |
|  | 25.5 | 33.3 | Found | 0.026 | A |
| 180 | 1.0 | — | Not Found | 0.047 | B |
|  | 1.5 | 0.08 | Not Found | 0.022 | A |
|  | 5.0 | 0.27 | Not Found | 0.018 | A |
|  | 25.0 | 2.15 | Not Found | 0.027 | A |
|  | 25.5 | 26.8 | Found | 0.033 | A |
| 170 | 1.0. | — | Not Found | 0.044 | B |
|  | 1.5 | 0.05 | Not Found | 0.021 | A |
|  | 5.0 | 0.20 | Not Found | 0.022 | A |
|  | 25.0 | 1.67 | Not Found | 0.023 | A |
|  | 25.5 | 20.0 | Found | 0.033 | A |
| 155 | 1.0 | — | Not Found | 0.049 | B |
|  | 1.5 | 0.03 | Not Found | 0.018 | A |
|  | 5.0 | 0.07 | Not Found | 0.026 | A |
|  | 25.0 | 1.25 | Not Found | 0.024 | A |
|  | 25.5 | 12.5 | Found | 0.035 | A |
| 150 | 1.0 | — | Not Found | 0.055 | B |
|  | 1.5 | — | Not Found | 0.047 | B |
|  | 5.0 | — | Not Found | 0.049 | B |
|  | 25.0 | 1.11 | Not Found | 0.046 | A |
|  | 25.5 | 11.1 | Found | 0.044 | A |

(1) Pressure (P) (kgf/cm$^2$)
(2) Speed of Deformation (mm/sec)
(3) Burr
(4) Surface Wavefront of Transmitted Light (RMS (λ))
(5) Central Thickness
A: Satisfactory

TABLE 1-continued

| Maximum Temp Tp (°C.) | (1) | (2) | (3) | (4) | (5) |
|---|---|---|---|---|---|

B: Unsatisfactory

* (—) indicates that no deformation rate was measured since deformation stopped.

As clearly seen from Table 1, optical elements with no burr, with preferable surface wavefront of transmitted light (less than 0.03λ, and λ=633 nm), and with desirable central thickness were provided when the maximum temperature (Tp) was from glass transition point (Tg+15° C.=155° C.) to Tg+60° C. (200° C.) and the pressure was 1.5–25.0 kgf/cm². In these preferable conditions, the rate of plastic deformation was below 10 mm/sec. With the maximum temperature (Tp) above Tg+60° C., the surface wavefront of transmitted light was good, but a burr was found on the optical elements since optical material entered the clearance. The rate of plastic deformation was high when the pressure (P) was above 25.5 kgf/cm², so that a burr was found on the optical elements. With Tp below Tg+15° C. or pressure (P) below 1.5 kgf/cm², no burr was found, but central thickness and the surface wavefront of transmitted light were inferior.

Figure 7B:
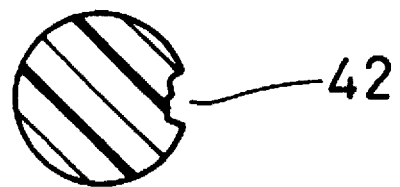
FIG. 7B is a cross-sectional view of the optical material with a gate cut section of the embodiment of the invention after being heated.

When the temperature of the optical material prepared by the injection molding method is raised, a gate cut section (41 in FIG. 7A) deforms toward the center of the material as shown in FIG. 7B (gate cut section 42), thus forming a concave section. In Example 2, the optical element was oriented so as to set the gate cut section facing the internal surface of the drum mold, thereby reducing the concavity of the gate cut section and obtaining preferable optical properties. The preferable optical properties were also found when the gate cut section was set to face a movable side of a pressing means (top mold in Example 2). However, when the gate section was set to face an immovable side of the press means (bottom mold in Example 2), the concave section at the gate cut section remained, so that preferable optical properties were not obtained. Table 2 shows evaluations of the surface wavefront of transmitted light in relation to the orientation of the gate section. The preferable conditions which provided desirable surface wavefront of transmitted light and no burr were applied to evaluate the surface.

TABLE 2

| | Direction of Gate Cut Section | | |
|---|---|---|---|
| | Internal Surface of Drum Mold | Movable Side (Top Mold) | Immovable Side (Bottom Mold) |
| (A) | ○ | ○ | X |

(A) Evaluation of Surface Wavefront of Transmitted Light
*○ = less than 0.03 RMSλ
X = impossible to measure As shown in Table 2, the optical properties of an element depend on how a gate section of an optical material is set. Thus, by controlling the orientation of the gate section, optical elements can be manufactured in high yield.

EXAMPLE 3

Figure 8A:
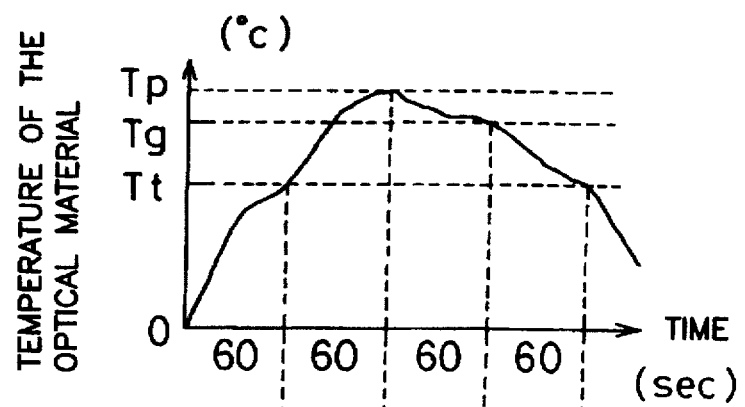
FIG. 8A is a graph showing the change in temperature of the optical element of the embodiment of the molding method of the invention during a molding process.
Figure 8B:
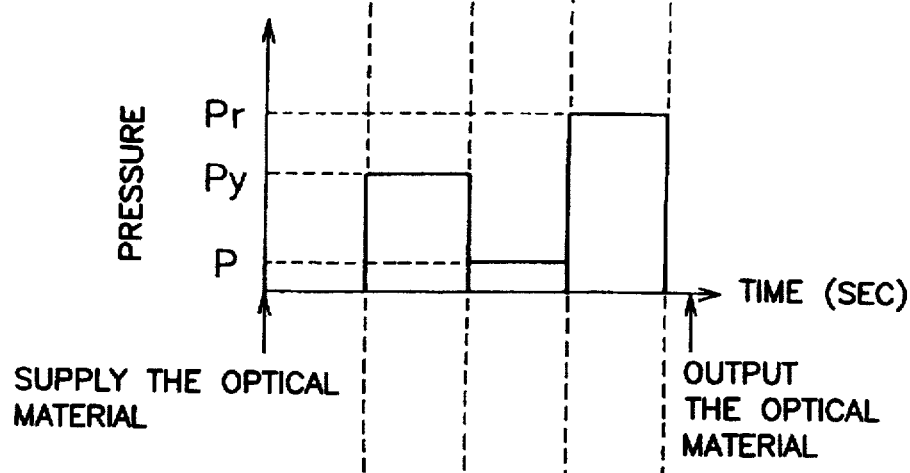
FIG. 8B is a graph showing the change in pressure of the optical element.
Figure 8C:
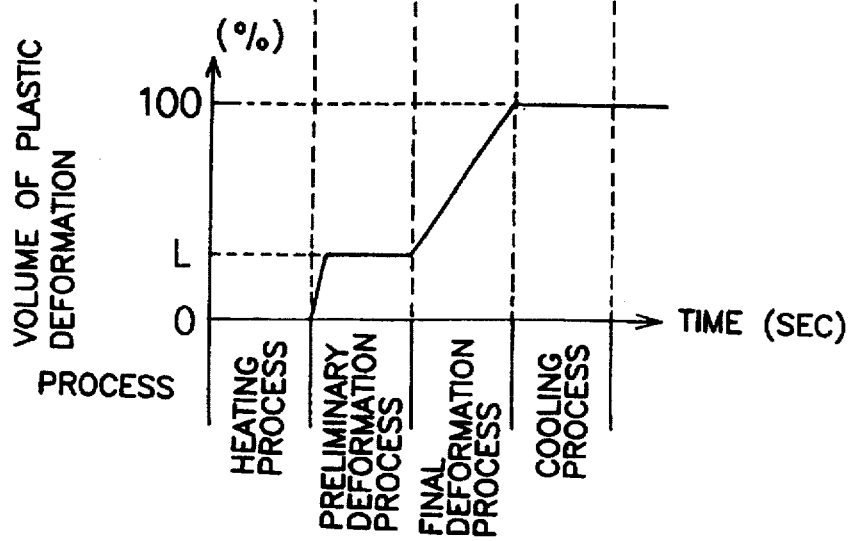
FIG. 8C is a graph showing plastic deformation of the optical element.

FIG. 8A shows the change in temperature of an optical material. FIG. 8B shows the change in pressure. FIG. 8C shows the change in plastic deformation. The horizontal axes indicate time.

FIG. 9A is a cross-sectional view, showing an optical material during a heating process. FIG. 9B is a cross-sectional view, showing the optical material during a preliminary deformation process. FIG. 9C is a cross-sectional view, showing the optical material during a final deformation process. FIG. 9D is a cross-sectional view, showing the optical material during a cooling process. In the figures, 15 is the optical material which was previously molded by the injection molding method, 16 is a top mold, 17 is a bottom mold, 18 is a drum mold, 19 is a first press head having a heating mechanism, 20 is a first press stage with a heating mechanism, 21 is a second press head having a heating and pressing mechanism, 22 is a second press stage with a heating mechanism, 23 is a third press head with a heating and pressing mechanism, 24 is a third press stage with a heating mechanism, 25 is a fourth press head having a heating and pressing mechanism, and 26 is a fourth press stage with a heating mechanism. The top or bottom molds, drum molds, and optical materials between the stages shift through carrier rails (not shown in the figures) while they are supported by carrier arms.

Figure 10A:
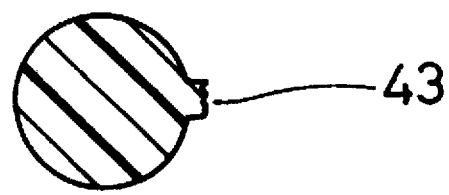
FIG. 10A is a cross-sectional view of an optical material with a gate cut section of the embodiment of the invention molded by the injection molding method.

An optical material 15 molded as in FIG. 10A by the injection molding method was placed between first press head 19 and first press stage 20 and between top mold 16, bottom mold 17 and drum mold 18.

Polyolefin resin was used for optical material 15. The glass transition point (Tg) was 140° C. while the deflection temperature (Tt) was 123° C. The gate cut section shown in FIG. 10A was set to face the internal surface of drum mold 18.

The temperature of first press head 19 and first press stage 20 was controlled so as to set the deflection temperature (Tt) of optical material 15 equal to 123° C. within sixty seconds (FIG. 9A).

In the preliminary deformation process (FIG. 9B), top mold 16, bottom 17, drum mold 18, and optical material 15 were deposited between second press head 21 and second press stage 22.

In the preliminary deformation process, optical material 15 was deformed to deformation level L (FIG. 8B and FIG. 8C) with 20 kgf/cm² pressure (Py). The rate of plastic deformation was 30 mm/sec. In this example, L was 60%. As in the heating process, the preliminary deformation process lasted sixty seconds. When the preliminary deformation process ended, the temperature of second press head 21 and second press stage 22 was set so as to bring the temperature of optical material 15 to a maximum of 180° C. (Tp).

Top mold 16, bottom mold 17, drum mold 18, and optical material 15 were deposited between third press head 23 and third press stage 24 in the final deformation process (FIG. 9C). The temperature of third press head 23 and third press stage 24 was controlled at a predetermined level (FIG. 8A) so as to cool the temperature of optical material 15 to around the glass transition point (Tg).

The final deformation of optical material 15 was carried out by applying 5.0 kgf/cm² pressure (P) with third press head 24. The rate of plastic deformation of optical material 15 was 0.27 mm/sec.

In the cooling process (FIG. 9D), top mold 16, bottom mold 17, drum mold 18, and optical material 15 were moved between fourth press head 25 and fourth press stage 26. The optical material was then cooled down to less than the deflection temperature (Tt) while it was pressed by 30 kgf/cm² pressure (Pr) with fourth press head 25. After the cooling process, fourth press head 25 rises. Top mold 16 is then opened so as to remove an optical element. The optical element had preferable surface wavefront of transmitted light and no burr.

Optical elements were evaluated while maximum temperatures (Tp) and pressure (P) were changed and the rate of plastic deformation during the final deformation process was changed. The results are shown in Table 3 below. The surface wavefront of transmitted light was evaluated by an interferometer.

TABLE 3

| (1) | (2) | (3) | (4) | (5) | (6) |
|---|---|---|---|---|---|
| 205 | 1.0 | 11.3 | Found | 0.027 | A |
|  | 1.5 | 14.0 | Found | 0.026 | A |
|  | 5.0 | 21.0 | Found | 0.024 | A |
|  | 25.0 | 35.3 | Found | 0.025 | A |
|  | 25.5 | 56.0 | Found | 0.028 | A |
| 200 | 1.0 | — | Not Found | 0.046 | B |
|  | 1.5 | 1.40 | Not Found | 0.022 | A |
|  | 5.0 | 5.65 | Not Found | 0.026 | A |
|  | 25.0 | 9.97 | Not Found | 0.021 | A |
|  | 25.5 | 42.3 | Found | 0.026 | A |
| 190 | 1.0 | — | Not Found | 0.042 | B |
|  | 1.5 | 0.09 | Not Found | 0.019 | A |
|  | 5.0 | 1.10 | Not Found | 0.028 | A |
|  | 25.0 | 4.82 | Not Found | 0.022 | A |
|  | 25.5 | 33.0 | Found | 0.026 | A |
| 180 | 1.0 | — | Not Found | 0.049 | B |
|  | 1.5 | 0.08 | Not Found | 0.025 | A |
|  | 5.0 | 0.27 | Not Found | 0.017 | A |
|  | 25.0 | 2.03 | Not Found | 0.022 | A |
|  | 25.5 | 26.0 | Found | 0.031 | A |
| 170 | 1.0 | — | Not Found | 0.044 | B |
|  | 1.5 | 0.05 | Not Found | 0.025 | A |
|  | 5.0 | 0.22 | Not Found | 0.021 |  |
|  | 25.0 | 1.79 | Not Found | 0.023 | A |
|  | 25.5 | 23.1 | Found | 0.032 | A |
| 155 | 1.0 | — | Not Found | 0.047 |  |
|  | 1.5 | 0.03 | NotFound | 0.028 | A |
|  | 5.0 | 0.08 | Not Found | 0.027 | A |
|  | 25.0 | 1.21 | Not Found | 0.022 | A |
|  | 25.5 | 12.8 | Found | 0.039 | A |
| 150 | 1.0 | — | Not Found | 0.059 | B |
|  | 1.5 | — | Not Found | 0.057 | B |
|  | 5.0 | — | Not Found | 0.048 | B |
|  | 25.0 | 0.88 | Not Found | 0.052 | A |
|  | 25.5 | 10.2 | Found | 0.049 | A |

(1) Maximum Temperature Tp (°C.)
(2) Pressure (P) (kgf/cm$^2$)
(3) Deformation Speed (mm/sec)
(4) Burr
(5) Surface Wavefront of Transmitted Light (RMS ($\lambda$))
(6) Central Thickness
* (—) indicates that no deformation speed was measured since deformation stopped.

As shown in Table 3, optical elements with preferable surface wavefront of transmitted light (less than 0.03 RMS), desirable central thickness and no burr were obtained when the glass transition point was from Tg+15° C. (155° C.) to Tg+60° C. (200° C.) and the pressure was from 1.5 kgf/cm$^2$ to 25.0 kgf/cm$^2$. In addition, the rate of plastic deformation was less than 10 mm/sec.

In order to prevent burrs, the rate of plastic deformation right before the end of deformation is critical. In the preliminary deformation process, deformation is not complete, so that the rate of plastic deformation in the process has no influence on the creation of burr.

In Example 3, one press head and press stage were applied in the heating process, preliminary deformation process, final deformation process, and cooling process. However, each process may be divided, and multiple processes can be combined. The shape of the optical material is not limited to a spherical shape. The shape may be similar to an optical element.

Figure 10B:
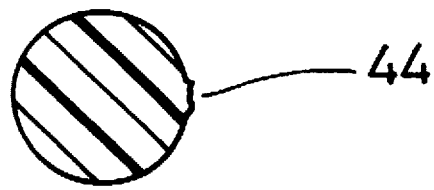
FIG. 10B is a cross-sectional view of the optical material with a gate cut section of the embodiment of the invention after being heated.
Figure 11:
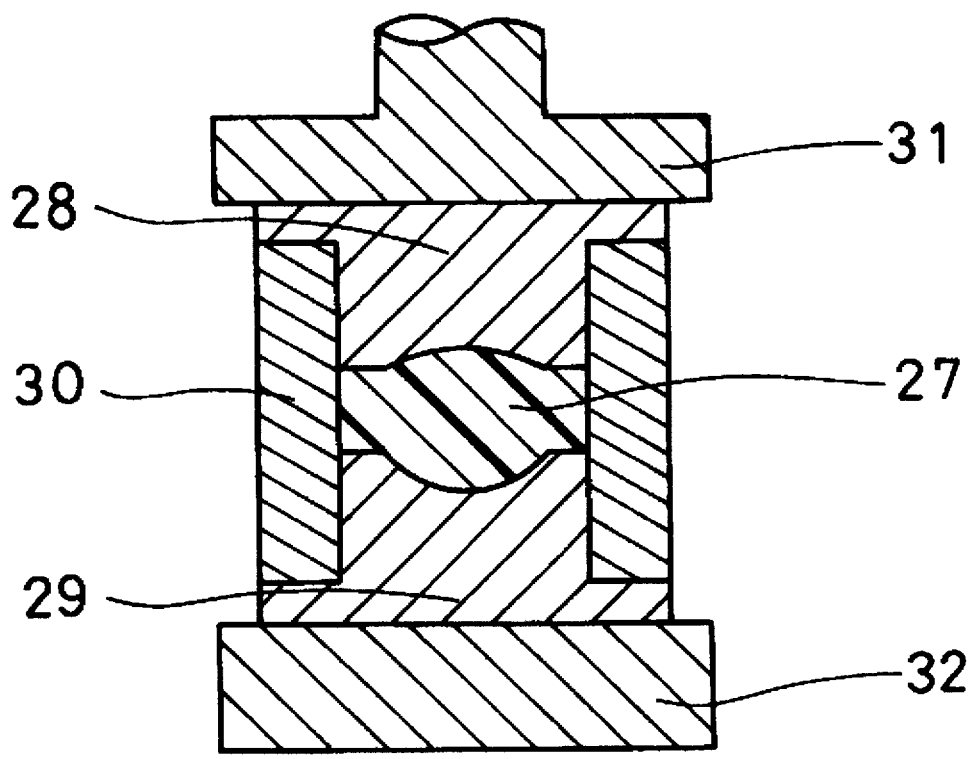
FIG. 11 is a cross-sectional view showing an optical material being pressed and deformed by a conventional molding method.
Figures 12A, 12B:
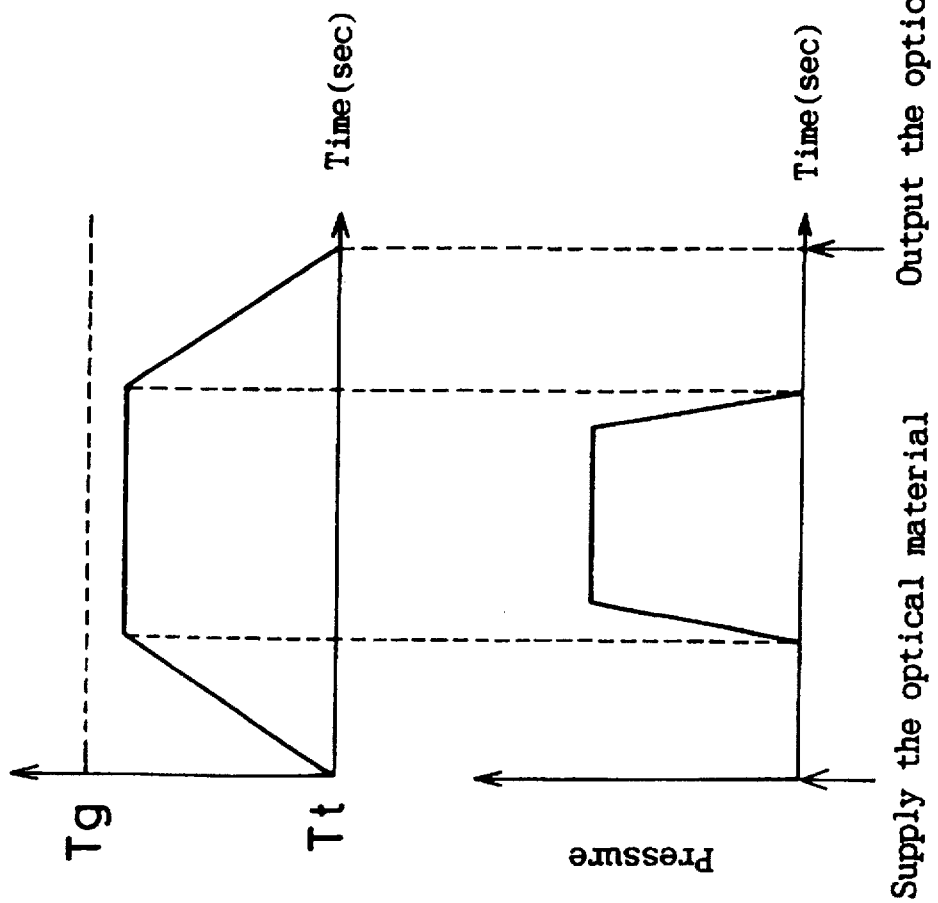
FIG. 12A shows the change in temperature of the optical material applied in the conventional method.
FIG. 12B shows the change in pressure in the conventional method.

When the optical material with a section of gate 43 as shown in FIG. 10A is applied, a concave section is not formed even with the increase in temperature of an optical material (section 44 in FIG. 10B). Therefore, it was found that a preferable optical element was provided without being dependent on how an optical material with a gate was placed in a molding device as long as the optical material with a section of gate was used. As a result, the molding process becomes simple, and optical elements with preferable properties are provided without being influenced by how an optical material is oriented in a molding device. Table 4 shows evaluations of the surface wavefront of transmitted light in relation to the orientation of the gate section.

TABLE 4

| | Direction of Gate Cut Section | | |
|---|---|---|---|
| | Internal Surface of Drum Mold | Movable Side (Top Mold) | Immovable Side (Bottom Mold) |
| (A) | O | O | O |

(A) Evaluation of Surface Wavefront of Transmitted Light
*O = less than 0.03 RMS$\lambda$ The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method for manufacturing optical elements, comprising the steps of:

supplying an optical material, which was previously roughly molded, to a space defined by a top mold, a bottom mold and a drum mold; and heating and pressing said optical material, wherein a rate of plastic deformation of said optical material is controlled to less than 10 mm/sec during a final deformation process so as to prevent said optical material from flowing into gaps between outer surfaces of said top mold and of said bottom mold and an inner surface of said drum mold, whereby a molded optical element free from peripheral burrs is provided.

2. The method of claim 1, wherein the optical material is heated during molding to a maximum temperature (Tp), with (Tg+15)≦Tp≦(Tg+60), wherein Tg is the glass transition temperature of the optical material.

3. The method of claim 2, wherein the optical material is pressed and deformed with 1.5–25.0 kgf/cm$^2$ of pressure in a range from the glass transit/on point (Tg) to the maximum temperature (Tp).

4. The method of claim 3, wherein the optical material is preliminarily deformed until the material reaches the maximum temperature (Tp), and wherein the optical material is pressed with 1.5–25.0 kgf/cm$^2$ of pressure while being cooled from said maximum temperature (Tp) to the glass transition point (Tg).

5. The method of claim 1, wherein the optical material is roughly molded by an injection molding method before a deformation process.

6. The method of claim 5, wherein the optical material has a gate cut section formed during the injection molding process, and wherein said gate cut section is convex.

7. The method of claim 5, wherein the optical material, which was already roughly molded, has a gate cut section, and wherein said optical material is deposited so that said gate cut section faces an internal surface of the drum mold or a moving one of the top mold.

8. An apparatus for manufacturing optical elements, comprising:

a top mold;

a bottom mold;

a drum mold;

heating means for heating an optical material supplied to a space defined by said top mold, said bottom mold and said drum mold;

pressing means for pressing the optical material via said top mold; and control means for controlling a rate of plastic deformation of the optical material, wherein the rate of plastic deformation of the optical material is controlled to less than 10 mm/sec during a final deformation process to prevent the optical material from flowing into gaps between outer surfaces of said top mold and of said bottom mold and an inner surface of said drum mold, whereby a molded optical element free from peripheral burrs is provided.

9. The apparatus of claim 8, wherein the heating means maintains temperature at $(Tg+15) \leq Tp \leq (Tg+60)$ during molding of the optical material, where Tp is maximum temperature of a mold and Tg is a glass transition point of resin of said optical material.

10. The apparatus of claim 9, wherein the pressing means deforms the optical material with 1.5–25.0 kgf/cm² of pressure within a range between the glass transition point (Tg) and the maximum temperature (Tp).

11. The apparatus of claim 9, wherein the pressing means preliminarily deforms the optical material until said optical material reaches the maximum temperature (Tp), and finally deforms said optical material with 1.5–25.0 kgf/cm² of pressure while said optical material is cooled from the maximum temperature (Tp) to the glass transition point (Tg).

12. The apparatus of claim 8, further comprising means for supplying optical material to the space defined by the top mold, the bottom mold and the drum mold so that a gate cut section of the optical material faces an internal surface of the drum mold or a moving one of the top mold and the bottom mold.

* * * * *